United States Patent [19]

Rifken

[11] 4,272,791
[45] Jun. 9, 1981

[54] METHOD AND APPARATUS FOR VIDEO RECORDING

[76] Inventor: Jerome C. Rifken, 304 Edwards Dr., Fayetteville, N.Y. 13066

[21] Appl. No.: 24,103

[22] Filed: Mar. 26, 1979

[51] Int. Cl.³ .................... H04N 5/78; H04N 7/10
[52] U.S. Cl. ................................. 360/33; 358/86; 358/114; 455/6
[58] Field of Search ............... 360/33; 455/3, 6; 358/86, 188, 127, 128.5, 114–116, 118

[56] References Cited

U.S. PATENT DOCUMENTS

| | | | |
|---|---|---|---|
| 3,729,581 | 4/1973 | Anderson | 358/114 X |
| 3,730,980 | 5/1973 | Kirk, Jr. | 455/6 X |
| 3,733,431 | 5/1973 | Kirk, Jr. et al. | 455/3 X |
| 3,859,457 | 1/1975 | Kirk, Jr. | 358/86 X |
| 3,882,266 | 5/1975 | Walding | 358/86 |
| 3,898,375 | 8/1975 | Hannan et al. | 358/115 |
| 4,085,422 | 4/1978 | Niwata et al. | 358/118 |
| 4,139,865 | 2/1979 | Iida et al. | 360/33 X |
| 4,173,024 | 10/1979 | Miller | 358/115 |

OTHER PUBLICATIONS

RCA Training Topics Bulletin: Dec. 21, 1978 (#PT-12178-31).
RCA Manual, "Installation and Operation on Cable TV (CATV) Systems."

Primary Examiner—Bernard Konick
Assistant Examiner—Aristotelis M. Psitos
Attorney, Agent, or Firm—B. E. Deutsch

[57] ABSTRACT

Apparatus for connecting a cable television system utilizing a multi-channel converter having a preselector switch and a preselected converter very high frequency output signal to a video cassette recorder and/or a television receiver. The apparatus includes an input for receiving the signals transmitted by the cable system; first and second conduits defining first and second flow paths, with the converter being disposed in the first flow path; a trap disposed in the second flow path for eliminating the preselected converter output signal from the signals transmitted by the cable system and passing through the second flow path; and a device for combining the preselected converter output signal in the first flow path and the signals transmitted through the second flow path and for transmitting the combined signal to the video cassette recorder and/or television receiver.

5 Claims, 1 Drawing Figure

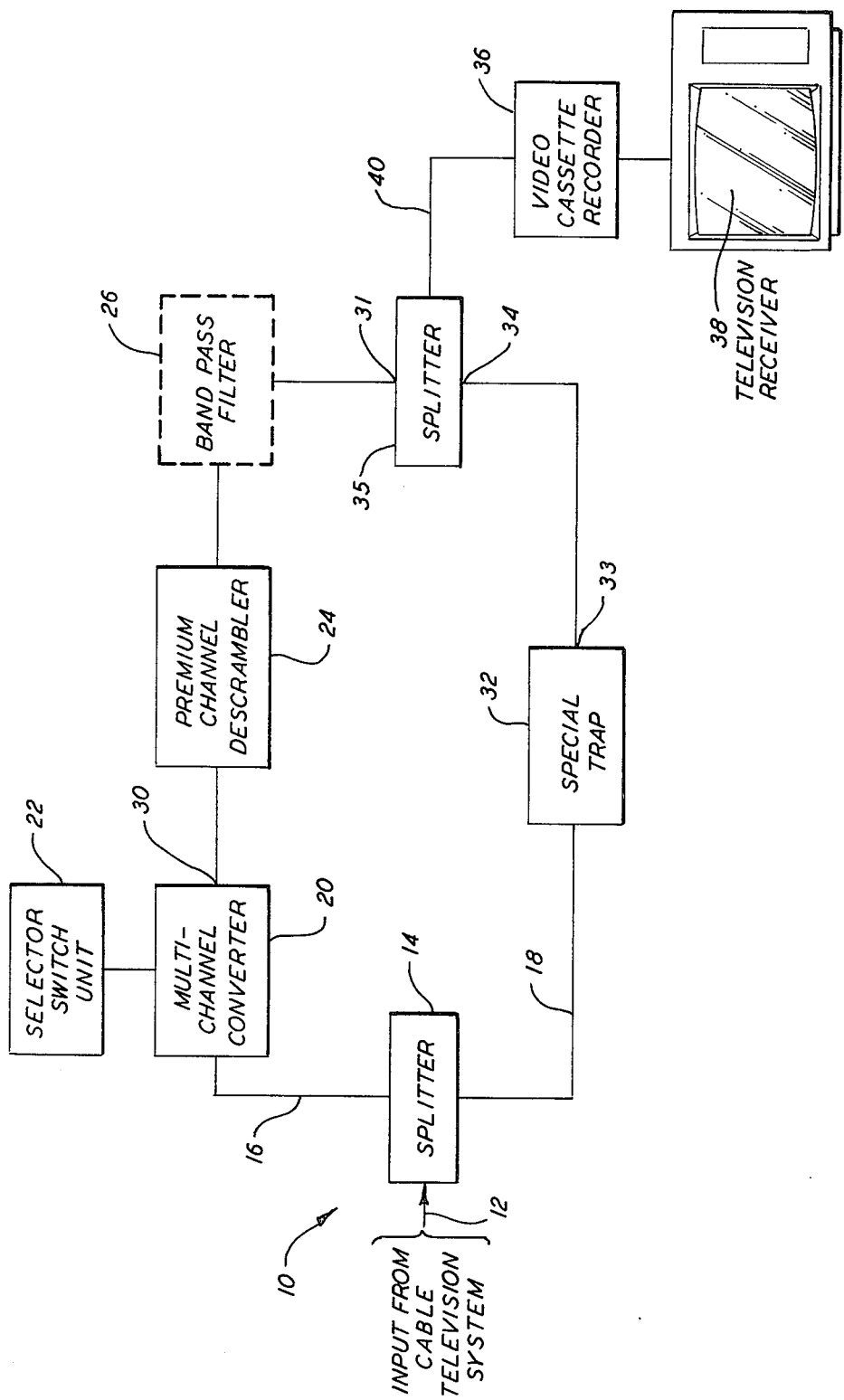

METHOD AND APPARATUS FOR VIDEO RECORDING

BACKGROUND OF THE INVENTION

This invention relates to broadening the utility of video cassette recorders and in particular to apparatus for enabling a user of a video cassette recorder connected to a cable television system employing a multi-channel converter box to achieve full programmer utility for the recorder.

The number of television receivers nationwide connected to cable television systems has grown dramatically in the last several years. Market surveys indicate approximately 13,000,000 homes are connected to a cable system, accounting for approximately a 20% market penetration. Forecasts indicate the market penetration will increase to at least 30% by 1982. Many of these cable television systems utilize a multi-channel converter for descrambling the very high frequency signals transmitted through the cable system. The converter has a preselected very high frequency output signal to which the television receiver is continuously set, e.g. channel 4. The converter also includes a preselector switch unit for permitting the user to select a single very high frequency signal from the entire range of signals transmitted by the cable system. The converter alters the selected very high frequency signal to the predetermined or preselected output signal for transmission to the television receiver. As used herein the term "very high frequency signals" includes the low and high band channels 2 through 13. Channels 2-13 are broadcast by the commercial television systems, whereas cable systems transmit both standard channels 2-13 and generally one or more of the special channels such as sub-channels A, C, or E, mid band channels A through I, or super band channels J through S.

In addition to the widespread use of cable television systems, the introduction of consumer video cassette recorders in the past few years has further increased the utility and overall user enjoyment of television. Video cassette recorders enable a person to video tape a television show for his own personal viewing pleasure. Essentially, the video cassette recorder is a convenience device for enabling a viewer to tape a television program that he may be unable to view when actually broadcast, either because the broadcast time is inconvenient or the viewer wishes to watch another program broadcast simultaneously with the program he wishes to record. A recent improvement in video cassette recorders enables a user to program the video cassette recorder to operate at preselected times during any consecutive seven days to record preselected programs appearing on any of the channels whether very high frequency or ultra high frequency, broadcast within the viewing area and received through the standard television antenna. However, video cassette recorders used in conjunction with cable television systems employing a multi-channel converter have not afforded the user full recorder utility.

For example, heretofore it has often been necessary for a user to obtain from a cable company a second converter box if the user wishes to record a first channel while viewing a second channel. In addition, the user must manually manipulate an external co-axial switch or switches to achieve the desired recording and viewing capabilities. The cable company's monthly charge to the user is increased by the foregoing arrangement since the cable company generally charges a monthly fee which increases with the number of converter boxes rented to the user.

Further, although programmable video cassette recorders are designed to automatically turn on and off and change channels at a predetermined time, on a given day within a seven day time span, the programmable video cassette recorder cannot override the preselector switch used in conjunction with the multi-channel converter box. Thus, programmable video cassette recorders are not fully functional with cable systems employing multi-channel converter boxes. For example, the programmable video cassette recorder may be connected to the cable system through a manual switch whereby the recorder may select any regular or standard very high frequency channel, i.e. channels 2-13, transmitted through the cable system. However, if it is desired to record a special channel, i.e., a channel transmitted through the cable system that is not a standard very high frequency channel, such as the sub band, mid band or super band channels, it is necessary to connect the multi-channel converter to the video recorder. Once the input of the recorder is connected to the output of the converter, the channel changing feature of the programmable video cassette recorder is eliminated.

Although the present invention achieves particular utility with television receivers in association with video cassette recorders and cable systems of the type described, the invention may also be employed with television receivers connected to the described cable systems and utilizing remote control channel changers. In cable systems using the multi-channel converter, the television receiver tuner is set at one channel, which is the preselected converter output channel, e.g. channel 4. Thus, the remote channel changer presently cannot be employed to change channels transmitted through the multi-channel converter device.

SUMMARY OF THE INVENTION

It is an object of this invention to broaden the utility of a video cassette recorder.

It is a further object of this invention for enabling a user of a video cassette recorder connected to a cable television system employing a multi-channel converter box to record one program and view a second program on a different channel without needing to rent a second multi-channel converter box from the cable television system and/or utilize a number of manually operated external switches.

It is a further object of this invention to enable a programmable video cassette recorder to automatically change channels even though the signals for the channels are transmitted by a cable television system employing a multi-channel converter box.

It is yet another object of this invention to provide apparatus capable of increasing the utility of remote control channel changing devices employed with television receivers connected to cable television systems employing multi-channel converters.

These and other objects of the present invention are attained in apparatus for connecting a cable television system to a video cassette recorder and/or a television receiver including input means for receiving a plurality of very high frequency signals transmitted by the cable television system. The apparatus further includes means for directing said transmitted signals through first and second signal conduits respectively defining first and second flow paths. A multi-channel converter is provided in the first flow path. The converter includes selector means for selecting a single very high frequency signal from the total signals transmitted through the cable television system. The converter changes the selected signal to a preselected converter very high frequency output signal. The apparatus further includes trap means including an output provided in the second flow path for eliminating the preselected converter output signal from the very high frequency signals transmitted by the cable television system. Combining means are connected to the first and second conduits for combining the preselected converter output signal with the very high frequency signals transmitted through the output of the trap means and for further transmitting the combined signals to a video cassette recorder and/or a television receiver.

BRIEF DESCRIPTION OF THE DRAWING

The single FIGURE of the drawing schematically illustrates the invention herein disclosed.

DESCRIPTION OF THE PREFERRED EMBODIMENT

Referring now to the drawing, there is schematically illustrated a system in accordance with the present invention. The system 10 includes electrically conductive conduit 12 for receiving the television signals transmitted by a cable television system. Typically, the signals permit a viewer to watch a number of standard channels, i.e. channels 2 through 13 and a number of special channels, such as sub channels A, C, and E. mid band channels A through I, and super band channels J through S. A two-way signal splitter 14 of the type sold by Magnavox Corporation, Model no. ML-2D is connected to conduit 12 for directing the very high frequency signals transmitted by the cable television system through a first flow path defined by electrically conductive conduit 16 and a second flow path defined by electrically conductive conduit 18.

A multi-channel converter 20 is disposed within the first flow path defined by conduit 16. The multi-channel converter is supplied by the cable television system, and includes a preselector switch unit 22 which enables the user of the cable television system to select a desired channel for viewing on his television receiver. Selector switch unit 22 includes a plurality of sub-switches for selecting the desired channel. Converter 20 alters the selected single very high frequency signal selected by the viewer to a preselected converter very high frequency output signal delivered at output 30 of the converter.

A descrambler 24 may be connected to the output 30 of converter 20. Descrambler 24 may be used to descramble the signal of a premium channel braodcast by the cable television system for an additional fee. The preselected converter very high frequency output signal is thence transmitted to a special band pass filter 26. The function of band pass filter 26 will be more fully described hereinafter. The signal delivered through band pass filter 26 is thence transmitted to one input 31 of a second splitter 35, similar to the type of splitter 14 hereinbefore identified.

The very high frequency signals transmitted through conduit 18 defining the second flow path are delivered into a special trap 32. Trap 32 is tuned to pass all the very high frequency signals transmitted by the cable television system except for the preselected very high frequency output signal delivered by converter 20. The specially tuned traps have been obtained from Eagle Comtronics Inc. of Phoenix, New York. Eagle is a manufacturer of channel traps for the cable system industry. At this time, it has been necessary to specially tune standard traps sold by Eagle to achieve the described function. Presently, the traps have been tuned to remove both the audio and video components of an entire preselected channel signal to a −60 db. For example, if the preselected converter output signal is channel 4, then trap 32 will operate to pass all very high frequency signals transmitted by the cable television system except for channel 4. The signals transmitted through trap 32 are delivered to an output 33 thereof, connected to a second input 34 of splitter 35.

Splitter 35 combines the signals transmitted through the first and second flow paths and delivers same through an electrically conductive conduit 40 to the input of a video cassette recorder 36. Recorder 36 may be either programmable or non-programmable with each type of recorder having utility with the present invention. The output from the recorder is delivered to the input of a television receiver 38. Alternatively, conduit 40 may be connected directly to the input of television receiver 38 in systems not having video cassette recorders wherein the television receiver is either remote controlled and/or electronically tuneable to receive one or more of the aforementioned special channels.

As noted previously, one of the primary features users of video cassette recorders desire is the capability to record a first program while viewing a second program on a different channel. In addition, the channel changing capability of the programmable video cassette recorder is one of its most attractive features from a marketing viewpoint. Presently, the user of a video cassette recorder employed with a cable television system having a multi-channel converter must utilize a second converter and/or at least one manually operated co-axial switch for enabling the user to view a first program broadcast on any of the channels transmitted through the cable system, while recording a second program on any of the other channels transmitted through the system. Further, the programmable type recorder's channel changing feature can not be utilized with any signal only transmitted through the multi-channel converter since the channel changing feature of the video cassette recorder can not override the preselector switch associated with the multi-channel converter. The programmable feature can only be utilized for unattended automatic selection of those channels transmitted by the cable system not requiring the user to employ the converter box for reception of the signals by the recorder and/or television receiver. Owners of programmable recorders connected to a multi-channel converter have been quite displeased by the aforedescribed shortcoming of their relatively expensive recorders.

The present invention eliminates the problems discussed hereinabove in the following manner. The user of the video cassette recorder selects one special channel for continuous transmission through multi-channel converter 20 by depressing the appropriate sub-switch of selector switch unit 22. All the very high frequency signals transmitted by the cable television system are directed by splitter 14 to the input of multi-channel converter 20 and trap 32 respectively connected to first conduit 16 and second conduit 18. The depressed subswitch of selector switch unit 22 associated with converter 20 continuously connects a single special channel to the output of converter 20. Thus, the preselected converter very high frequency output signal generated by converter 20 continuously transmits the same selected special channel so long as the depressed subswitch of selector switch unit 22 remains in its chosen position.

Trap 32, as noted hereinbefore, will pass all of the standard signals transmitted by the cable system, except the preselected converter output signal generated by converter 20. For example, as noted previously, if the converter output signal is channel 4, then trap 32 will prevent continued transmission of channel 4 through the second flow path. Thus all the standard very high frequency signals transmitted by the cable system will pass through trap 32 and appear at its output 33 except for channel 4. Trap 32 is specifically designed and tuned to remove the entire converter output channel from output 33. Splitter 35 functions to combine the preselected converter output signal, i.e. channel 4, with the signals transmitted through trap 32, i.e. all standard very high frequency signals transmitted through the cable television system except for channel 4.

Thus, if the user of video cassette recorder 36 wishes to record the preselected channel and view any of the other standard channels, or vice versa, he is able to do so since the output from splitter 35 includes all signals transmitted by the cable television system. Secondly, if the video cassette recorder includes a programmable feature, the user thereof may obtain the benefits of the channel selecting feature since, all standard channels plus at least one special channel transmitted through the cable television system will appear at the output of splitter 35. If the video cassette recorder is programmed to record the preselected special channel determined by selector switch unit 22, that channel will appear at the input to the recorder as the preselected converter very high frequency output signal. If the recorder is programmed to record one of the standard channels at any other time the standard channels are also provided at the input of the recorder via the transmission of such signals through trap 32. Thus, greater programmer utility is obtained through the operation of the present invention.

To insure that only the preselected converter output signal is transmitted through the first flow path to combining means 35, band-pass filter 26 may be employed. Filter 26 removes any portions of additional very high frequency signals that may be carried with the preselected output signal due to harmonics or other interference causing phenomena.

While the present invention is particularly useful in combination with video cassette recorders and television receivers connected to cable systems using a multi-converter device, the invention can also be employed with television receivers using a remote control channel changing device and connected to a cable system of the type described. By continuously connecting a preselected special channel to the converter output signal, typically a standard very high frequency channel, and then passing the remaining channels through trap 32, the invention continuously transmits all standard channels plus at least one special channel to the television receiver. In effect, converter 20 changes a special, non-standard signal transmitted by the system to a conventional or standard very high frequency signal for transmission to the television receiver. Thus, the remote channel changer can be utilized to select one desired special channel for viewing from any of the signals transmitted through splitter 35.

While a preferred embodiment of the present invention has been described and illustrated, the invention should not be limited thereto but may be otherwise embodied within the scope of the following claims.

What is claimed is:

1. A control system for connecting a cable television system to a video cassette recorder and a television receiver comprising:

input means for receiving a plurality of very high frequency television signals transmitted by said cable television system;

means for directing said transmitted signals through first and second conduits defining respectively first and second signal flow paths;

a multi-channel converter provided in said first flow path including selector means for selecting a single very high frequency signal from the plurality of very high frequency signals transmitted by said cable television system and for converting said single signal to a preselected converter very high frequency output signal;

trap means including an output provided in said second flow path for eliminating said preselected converter output signal from the very high frequency signals transmitted by said cable television system;

means connected to said first and second conduits for combining said preselected converter output signal and the very high frequency signals transmitted from the output of said trap means;

a video cassette recorder connected to an output of said combining means for receiving said combined signals whereat any very high frequency signal comprised within the cable television system transmitted signals may be recorded; and a television receiver connected to the output of said combining means for receiving said combined signal whereat any signal comprised within the cable television system transmitted signals may be viewed.

2. A system in accordance with claim 1 wherein said video cassette recorder includes programmable means for automatic selection of specific very high frequency signals comprised within the signals transmitted by said cable television system.

3. A system in accordance with claims 1 or 2 further including trap means for receiving said preselected converter output signal for removing any additional very high frequency signals carried with said selected converter output signal.

4. A method of operating a video cassette recorder and television receiver on a cable television system comprising the steps of:

receiving the very high frequency signals transmitted by the cable television system;

directing the very high frequency signals through first and second flow paths;

selecting a single very high frequency signal from the total signals directed through the first flow path;

converting the selected signal to a preselected very high frequency output signal;

eliminating the preselected very high frequency output signal from the cable system signals directed through the second flow path;

combining the preselected very high frequency output signal with the remaining signals passing through the second flow path;

directing the combined signals to a video cassette recorder whereat any channel comprised within the signals transmitted by the cable television system may be recorded; and further directing the combined signals to a television receiver whereat any channel comprised within the signals transmitted by the cable television system may be viewed.

5. A method in accordance with claim 4 further including the steps of:

trapping the preselected very high frequency output signal for insuring that only said signal is directed through said first flow path by removing any additional very high frequency signals carried with said preselected signal.

* * * * *